July 8, 1969   G. N. KOEHLER   3,454,909
SYNCHRONOUS-MOTOR TIME-DELAY RELAY
Filed July 24, 1967   Sheet 1 of 4
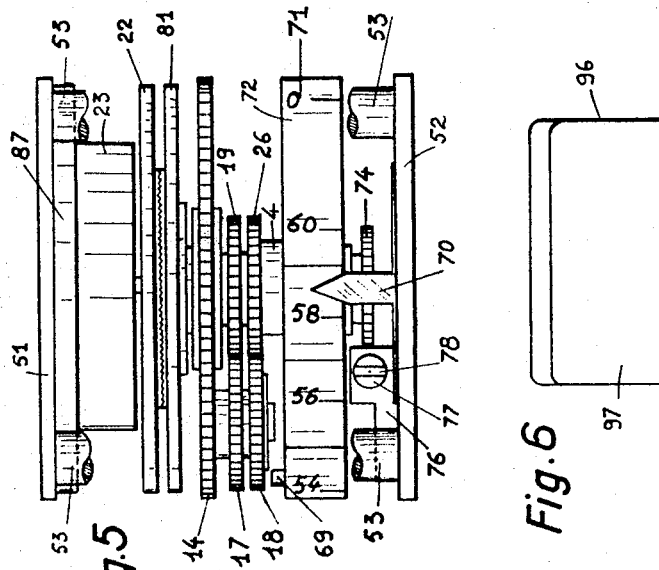
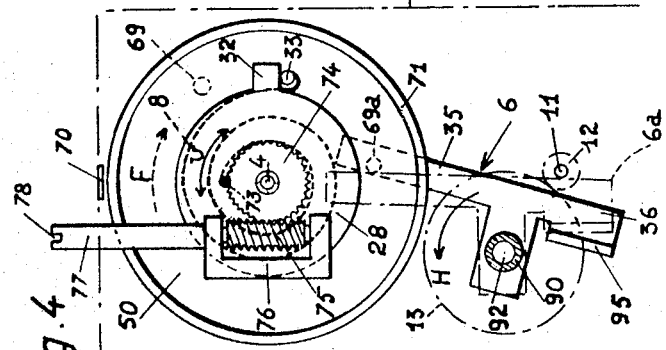
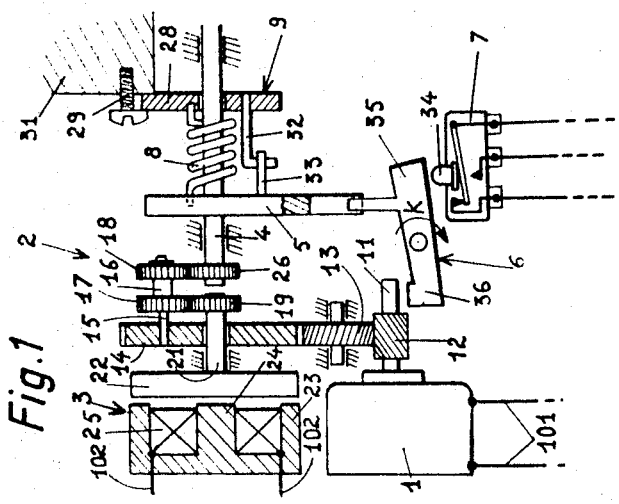
INVENTOR
GÉRARD N. KOEHLER
By Young & Thompson
ATTYS INVENTOR
GÉRARD N. KOEHLER
BY Young & Thompson
ATTYS.

July 8, 1969  G. N. KOEHLER  3,454,909
SYNCHRONOUS-MOTOR TIME-DELAY RELAY
Filed July 24, 1967  Sheet 4 of 4
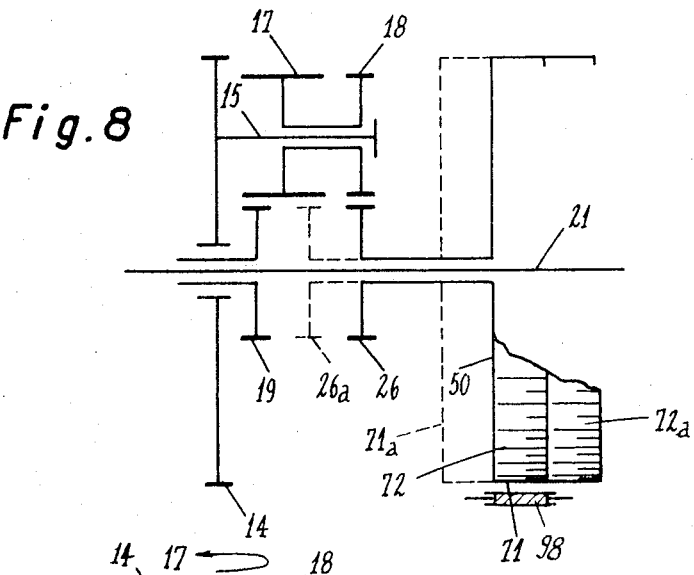
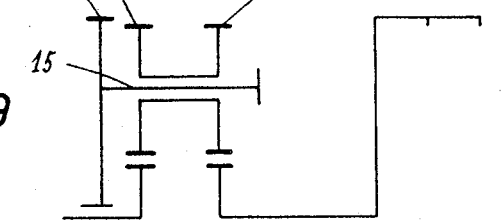
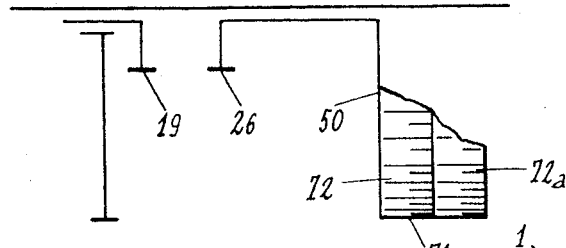
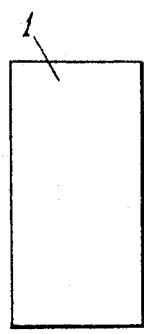
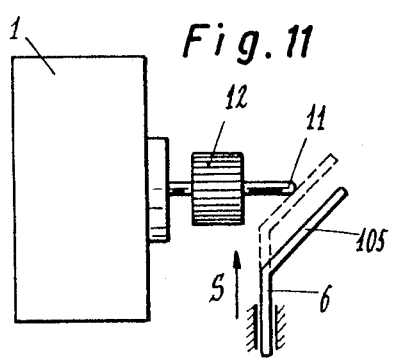
INVENTOR
GÉRARD N. KOEHLER
By Young + Thompson
ATTYS

United States Patent Office 3,454,909
Patented July 8, 1969

3,454,909
SYNCHRONOUS-MOTOR TIME-DELAY RELAY
Gérard N. Koehler, Saint-Cloud, France, assignor to Chauvin Arnoux et Compagnie, Paris, France, a French company
Filed July 24, 1967, Ser. No. 655,487
Claims priority, application France, July 27, 1966, 71,041
Int. Cl. H01h 7/10, 43/02
U.S. Cl. 335—65      13 Claims

ABSTRACT OF THE DISCLOSURE

Time-delay relay for industrial timing mechanisms, comprising a synchronous motor which drives, through a reduction gear, a cam-shaft which brings about, at a pre-determined angular position of the cam, control of an electrical contact, the said relay also comprising a differential mechanism located between the motor and the cam-shaft, and a device ensuring the locking, and subsequent release, of one of the outputs of the diffierential, which brings about respectively the initiation of the time-delay and the resetting to zero thereof, characterized in that the differential mechanism, of the flat epicycloid type, comprises a planetary carrier which receives the movement of the synchronous motor, a first sunwheel associated with an electric brake controlling its rotation, and a second sunwheel which drives the cam-shaft.

The externally-toothed differential mechanism comprises a toothed crown carrying at least two planetary gears angularly integral, one of the said planetaries engaging with a sunwheel carried by the cam-shaft, and the other planetary engaging with a second sunwheel, the shaft of which carries a brake plate pertaining to the electric brake.

---

The present invention relates to a time-delay relay, for use in industrial timing mechanisms, capable of executing electrical switching operations in accordance with a pre-determined programme and of being modified within wide limits at the will of the user.

Numerous types of time-delay relay for industrial use are already known. In one of these types, a synchronous motor is provided which drives a cam-shaft by means of a reduction gear and an electro-magnetic clutch. The cam-shaft actuates an electric contact. The delay may be adjusted by altering the angular starting position of the cam-shaft.

Also known are time-delay relays with automatic re-setting, in which the cam-shaft drives a spring which is tensioned during the delay. At the end of the delay, the cam-shaft is de-clutched from the synchronous motor, and the spiral spring brings the cam-shaft back to its starting position by reverse rotation.

In the foregoing systems, a special problem is presented by the reduction gear, which may have as many as six or more successive gears. Reduction gears of this kind are bulky, costly, and cause appreciable friction. Another problem is the design of the electro-magnetic clutch.

It is also known to produce synchronous-motor time-delay relays in which a differential mechanism is located between the synchronous motor and the cam-shaft and serves to transmit motion. In these diesigns one of the differential outputs is provided with an electro-magnetic brake which controls the locking or releasing of the corresponding output, thus replacing the clutch in the designs mentioned above. These relays, however, have the same disadvantages as the others as regards the reduction gear.

Another difficulty encountered is that of regulating the time-delay. It is usual to provide a stop which is friction-mounted on a fixed part and which is struck by the cam when the time-delay is re-set. If there is too much friction, adjustment of the stop is difficult. If there is not enough friction, the stop is displaced by the shock, causing a shift in the time-delay.

Furthermore, in order to obtain adequate accuracy with a needle moving across a dial, a frontal surface must be provided, and this takes up a considerable amount of space.

In the known devices, disconnection of the motor must be accomplished by means of a second contact which is released after the operating contact. Adjustment of the interval between these two contacts is a delicate operation and, in the event of mal-adjustment, mechanical locking of the slow shaft may cause mechanical deterioration of the device.

The time-delay relay according to the invention is intended to overcome these various disadvantages and limitations.

According to the invention, the time-delay relay for use in industrial timing mechanisms, comprising a synchronous motor which drives, through a reduction gear, a cam-shaft controlling, at a pre-determined angular position of the cam, an electrical contact, the said relay also comprising a differential mechanism located between the motor and the cam-shaft, and a device to provide for the locking and subsequent release of one of the differential outputs, which brings about respectively the initiation of the time-delay and the re-setting thereof, is characterized in that the differential mechanism, of the planar epicycloidal type, comprises a planetary-gear carrier driven by the synchronous motor, a first sunwheel associated with an electric brake controlling its rotation, and a second sunwheel which drives the cam-shaft.

In this design, therefore, the differential, in addition to fulfilling its previous function, plays the fundamental part of a reduction gear, thus making unnecessary the use of multiple-gear-train reducing mechanisms, since the type of differential selected, and its method of mounting, make it possible to obtain a very considerable reduction ratio. Moreover, the electric brake replaces the delicate and costly electro-magnetic clutches.

The differential mechanism preferably comprises a toothed crown wheel carrying at least two angularly-integral planetary gears, one of these planetary gears engaging with a sunwheel carried by the cam-shaft, and the other planetary gear engaging with a second sunwheel, the shaft of which carries a brake plate pertatining to the electric brake.

According to one advantageous arrangement, the two sunwheels of the differential are co-axial, the electric brake comprises an electro-magnet and a magnetic brake plate mounted to slide axially along the common axis of the sunwheels and subjected to the action of springs counteracting the attraction of the electromagnet, this non-roating brake plate carrying a crown of saw-teeth and being mounted rotatably between the electromagnet and a plate integral with that of the two sunwheels and which is independent of the cam-shaft, this plate and the coil of the electro-magnet each being equipped with a saw-tooth crown. Thus, depending upon the orientation of the sliding plate, a time-delay may be obtained at will when the electro-magnet is energized or, on the contrary, de-energized.

In accordance with a preferred embodiment, the control cam, consisting of a drum with a time graduation and carrying a pin, actuates a pivoting lever which, when pushed by the said pin, brings about in sequence pressure on the push-button of a switch and frictional locking of the synchronous-motor shaft.

Other details of the invention will emerge from the following specification.

In the attached drawings of various methods of execution of the invention, given by way of non-restrictive examples:

FIG. 1 is a highly schematic view of the essential elements of a relay according to the invention;

FIG. 4 is a simplified section along IV—IV in FIG. 2;

FIG. 5 is a plan view of the upper part of the relay along V—V in FIG. 2, with the cover removed;

FIG. 6 is a view similar to that in FIG. 5, with the cover in place;

FIG. 8 is a simplified diagram of a variable-ratio relay comprising a sliding sunwheel;

FIG. 9 is a similar diagram of a relay comprising planetary gears which may be mounted so that they can be turned round.

FIGS. 10 and 11 are schematic views of various designs of the motor brake device.

Figure 2:
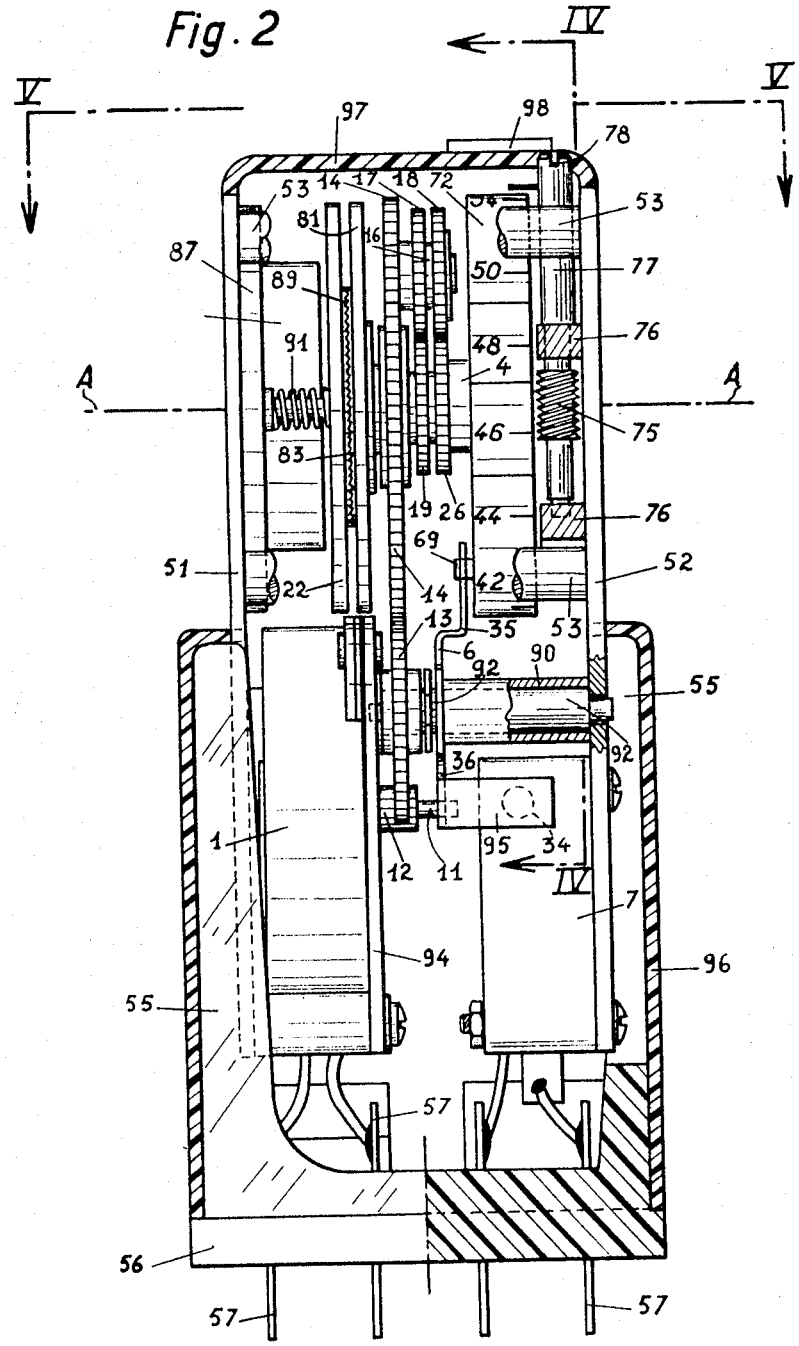
FIG. 2 is a side elevation of an industrial design of the relay, a part of the stand being omitted.

In the form of execution of the invention shown schematically in FIG. 1, the automatic re-setting time-delay relay comprises essentially a synchronous motor 1 (or a regulated motor of similar function) which drives a differential mechanism 2 acting as a reduction gear. One of the outputs of differential 2 is controlled by an electric locking brake 3 permitting initiation of the time-delay. The other output consists of a cam-shaft 4. Shaft 4 carries a cam 5 which actuates, as a function of its angular position, a lever 6 having two functions: in its operating position, lever 6 provides for locking motor 1 and for actuating a switch 7, or another contact, preferably quick-breaking.

A return spring 8 tends to bring cam 5 back towards an adjustable stop which will be described hereinafter and which is associated with a device marked 9.

More particularly, the construction of the relay, the essential elements of which have just been outlined, is as follows:

Synchronous motor 1 may be of the reluctance type (dissymmetry in the iron of the squirrel cage of an asynchronous motor), or preferably, of the permanent-magnet type, for example ferrite. This motor may with advantage be supplied with single phase in order to simplify electrical control (circuit 101). The choice of direction of rotation may then be determined by a mechanical system of the non-return, resilient-blade type, or preferably by an electric dephasing system, with a condenser or, preferably, a dephasing ring. With a system of this kind, the motor reaches its synchronized speed in the direction desired a quickly a possible.

Furthermore, this motor may have its output shaft 11 locked without producing any abnormal heating. For instance, the consumption of the motor increases by less than 10% when shat 11 is locked, the normal consumption being a few volt-amps.

Shaft 11 of motor 1 carries a gear 12 which drives, through an auxiliary gear 13, crown wheel 14 of differential 2, acting as a reducer. Gear 13 facilitates the relative positioning of motor 1, differential 2, and brake 3.

Crown wheel 14 acts as a planetary-gear carrier. It comprises a shaft 15 on which are journalled two planetary gears consisting of gears 17, 18, angularly integral. Gear 17 engages with a sunwheel 19 carried by one of the output shafts 21 of differential 2. Shaft 21, which is mounted slidably, carries a locking plate 22 of magnetic metal which constitutes the moving armature of electric brake 3. In the example described, the latter also comprises an electro-magnet 23 consisting of a cylindrical magnetic circuit in the form of a pot, having a central core 24 and an annular winding 25 energized by a control circuit 102.

The other gear 18 engages with a second sunwheel 26 carried on cam-shaft 4.

Thus reducer 2 is of the planar epicycloid type, also known as a "Pecqueur Train," externally toothed, which provides a large reduction (of the order of 1000 or more) with a small number of gears.

If the numbers of teeth of gears 17, 18, 19, 26 are designated $n_{17}$, $n_{18}$, $n_{19}$, $n_{26}$, the reduction ratio $W4/W14$ in the speed of cam-shaft 4 in relation to the speed of crown wheel 14, when shaft 21 carrying second sunwheel 19 is locked by brake 3, is as follows:

$$W4/W14 = 1 - (n_{19} \cdot n_{18} / n_{17} \cdot n_{26})$$

The nearer the second term is to unity, the higher the reduction ratio. If gears 17 and 26 have the same number of teeth "$n$," and if gears 18 and 19 have respectively $(n-p)$ and $(n+p)$ teeth, then:

$$W4/W14 = p^2/n^2$$

It is thus apparent that "$p$" should be equal to 1 and that "$n$" should be as large as possible.

If, for example, gears 17 and 26 have the same number of teeth "$n$," and if gear 18 has one extra tooth $(n+1)$, while gear 19 has one tooth less $(n-1)$, it will be seen that the reduction ratio is $1/n^2$, for example $\frac{1}{2500}$ when $n=50$ teeth, which corresponds to a considerable reduction ratio, in spite of the fact that the mechanical means used are very simple. Under these conditions, with a motor rotating, for example, at 250 r.p.m. and a reduction of $\frac{1}{12}$ through gears 12 and 13, shaft 4 integral with sunwheel 26 makes one revolution in about 2 hours. A reduction ratio of this magnitude can be obtained otherwise only by using an excessive number of gear trains.

Spring 8 is, for example, of the helicoidal type, one of its ends being integral with cam 5 and the other with a plate 28 traversed freely by shaft 4, the angular position of the said plate being fixed by means of a peripheral locking screw 29 engaging in a support 31.

Plate 28 carries a stop 32. Cam 5 carries a pin 33 which spring 8 tends to bring up against stop 32 by the rotation imparted to the said cam.

The angular-adjustment system, consisting schematically of screw 29, makes it possible to alter through nearly 360° the angle through which cam 5 must travel from its initial stopped position, corresponding to the abutment of parts 32, 33, to its pre-determined position for actuating lever 6. This angle defines the duration of the time-delay.

Cam 5 may carry a scale making it possible to read the time set by means of stop 32.

Lever 6 is arranged in relation to micro-switch 7 (whose actuating finger is marked 34), and to motor shaft 11 in such a manner that its rocking in direction K, caused by cam 5, first of all brings about, via arm 35, the switching of micro-switch 7 by pressure on actuating finger 34. Lever 6 then ensures, via arm 36, the locking of motor 1 by pressure of the said arm 36 on motor shaft 11.

Micro-switch 7 is of the quick-contact type well known per se. The relay may comprise a plurality of similar micro-switches, angularly displaced, for successive actuation by lever 6.

The relay functions as follows:

Plate 28 is adjusted to a suitable angular position for the time-delay required, and is then locked in this position by screw 29. If motor 1 rotates continuously, initiation of the delay is effected by locking shaft 21 integral with sunwheel 19. All that is required to effect this locking is to energize electro-magnet 23 by dispatching a control signal to conductors 102.

Plate 22 then lays itself against core 24 and the yoke of electro-magnet 23, thus preventing rotation of sunwheel 19.

It is understood that motor 1 may also be supplied with power at the same time as electro-magnet 23 to initiate the time-delay.

During the slow rotation of shaft 4, spring 8 is tensioned.

At the required moment, cam 5 actuates lever 6 which presses on finger 34. Arm 36 then locks shaft 11 of motor 1. As this motor has a low torque, locking is easily obtained. This avoids the transmission of a considerable torque to the differential by locking its output, and shaft 11 of motor 1 is also prevented from oscillating about its locked position, since oscillation of this kind may bring about premature wear in the gears. In fact the torque of a synchronous motor is pulsating, both as a function of angle and as a function of time.

When the timing mechanism has completed its cycle, and it is desired to re-set it, it is necessary only to de-energize locking electro-magnet 23. It is precisely differential 2 which allows return spring 8 to rotate plate 22 through a fraction of a revolution, without the necessity of planetary-carrying crown wheel 14 carrying out, in a reverse direction, the rotation which it executed previously during the time-delay.

The combination according to the invention, namely, an epicycloid differential with an electro-magnetic brake acting upon one of the output shafts, thus provides, among others, the advantage of limited bulk, a reduction in the number of parts, and considerable ruggedness, in comparison with previous devices of the reduction-gear type with an electro-magnetic clutch on the output shaft.

In the industrial design of the invention, which will now be described with reference to FIGS. 2 through 6, elements performing the same function as in the simplified design in FIG. 1 will be given the same references.

In this design, the relay mechanism is located between two side plates 51, 52 joined by two parallel spacers 53. Plate 51 carries synchronous motor 1 and plate 52 carriers switch 7. This assembly is accommodated between the four angle uprights 55 of an insulating base through which pass connecting blades 57. The overall dimensions and arrangement of base 56 and blades 57 correspond to those of similar elements of other known relays of the plug-in type, thus permitting interchangeable mounting of the time-delay relay by plugging into a panel.

Figure 3:
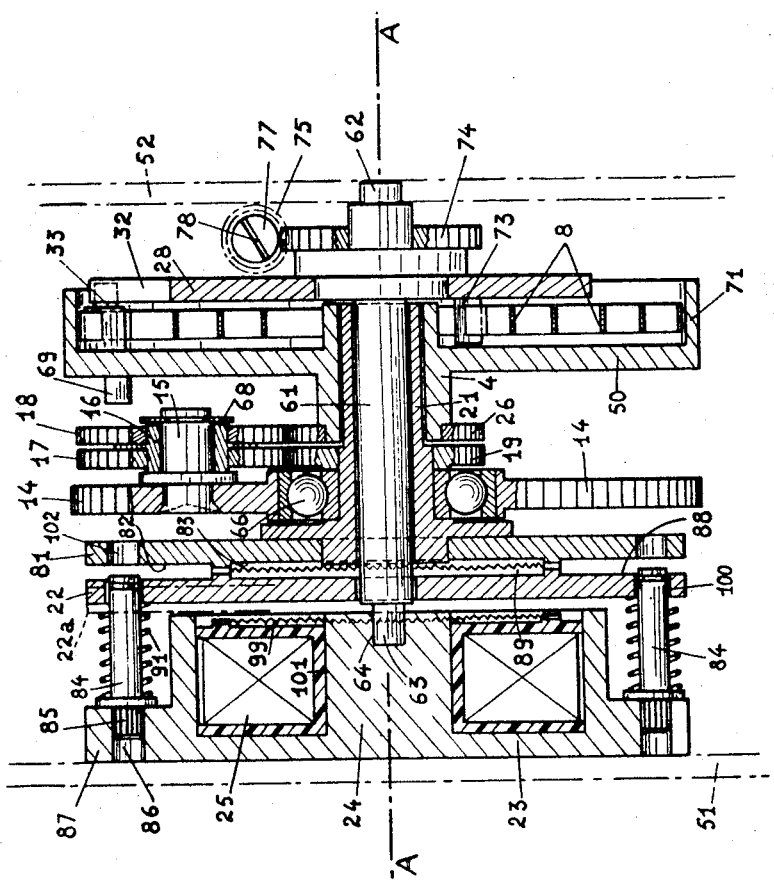
FIG. 3 is an axial section, on a large scale, of the electric brake, differential mechanism, and resetting device.

Differential mechanism 2 acting as a reducer, electric brake 3, and cam 5 and its accessories are axially aligned along A—A at the end opposite to base 56, axis A—A corresponding to the alignment of output shafts 4 and 21 in FIG 1. Axis A—A materializes in the form of a shaft 61 comprising a journal 62 located in side plate 52 and a journal 63 running in a bearing 64 in core 24 of electromagnet 23, the latter being attached to side plate 51 (FIG. 3).

Assembly is as follows:

A hollow shaft 21 is passed over shaft 61, the said shaft 21 carrying a bearing 66 carrying crown wheel 14. Planetary-carrying shaft 15 on the said crown wheel is equipped with a ring 16 retained by a split ring 68, planetary gears 17 and 18 being keyed to the said ring 16. Sunwheel 19 is integral with hollow shaft 21. Sunwheel 26 is turn attached to a second hollow shaft 4 arranged around hollow shaft 21.

Shaft 4 is integral with cam 5, which in this case consists of a drum 50. The element which actuates arm 35 of lever 6 is a button 69 located on the outside of the said drum.

The cylindrical edge 71 of drum 50 carries a scale 72 (FIG. 2), for example, in seconds, corresponding to the duration of the time-delay (for example from 0 to 60 seconds). The end face of the relay has a pointer 70 (FIG. 5) which makes it possible to read off the duration of the time-delay set.

As in FIG. 1, the time-delay-adjustment device comprises a plate 28 attached to shaft 61. In this case, adjustable initial stop 32 of plate 28 consists of a radial finger (FIG. 4).

Pin 33 on cam 5 consists of a pin which also serves for hooking on automatic-reset-spring 8, consisting in this case of a spiral spring, the other end of which is hooked on to a button 73.

For the purpose of adjusting the angular position of stop 32, a gear 74 is provided which is integral with shaft 61, rotation of which may be effected by tangential worm 75 held in a stirrup 76 on side plate 52 and integral with a rotating rod 77 terminating in a slot 78 to accommodate the blade of a screwdriver.

Electric brake 3 consists of the following: attached to hollow shaft 21 is a plate 81, one face of which carries a saw-tooth crown 83.

Locking plate 22, made of a magnetic metal and of the same diameter as plate 81, is slidably mounted on shaft 61, being guided in its movement by rods 84 parallel with axis A—A and equipped with a grooved stem 85, the said rods being a force fit in bores 86 drilled in a flange 87 surrounding electro-magnet 23. Rods 84 traverse plate 22 through bores 100.

One of the faces 88 of plate 22 has a saw-tooth crown 89 similar to crown 83. In the example under consideration, the assembly is such that the brake is applied to shaft 21 when winding 25 is not energized. To this end, saw-tooth crown 89 is directed towards crown 83 and return springs 91, arranged around rods 84, bring the teeth of crown 89 into engagement with those of crown 83, in such a manner that with no current flowing, plate 81, shaft 21, and sunwheel 19 are angularly locked.

Finally, lever 6 carries a sleeve 90 surrounding a shaft 92 (FIG. 2) which carries intermediate gear 13. Shaft 92 runs in side plate 52 and in an end plate 94 of motor 1.

Arm 35 of lever 6 is located along the path of button 69 of drum 50. The other arm 36 is elbowed and carries a vane 95 which can actuate button 34 of switch 7, after which the edge of lever 6 rests on shaft 11 of motor 1.

The relay is completed by a cover 96, made for example of translucent plastic material and passed over side plates 51, 52 until it is stopped by base 56. Arranged in end face 97 of the said cover is an inspection hole 98 located vertically above pointer 70 (FIG. 6). A bore 99 permits the passage of the head of control rod 77.

The operation of the relay thus arranged is as follows:

Electro-magnet 23 having been energized, brake plate 22 is attracted by core 24 and moves to 22a (FIG. 3). Toothed crowns 89 and 83 are moved apart, and shaft 21 and its accessories may rotate freely on shaft 61.

If rod 77 is then turned, worm 75 causes gear 74 to rotate in direction U (FIG. 4) and plate 28 and its finger 32 rotate therewith. Since drum 50 is urged by spiral spring 8 so that pin 33 abuts against stop finger 32, graduated edge 71 of drum 50 passes in front of pointer 70. Thus the graduation corresponding to the time-delay required may be brought in front of the said pointer.

If winding 25 is de-energized, plate 22 returns to the position in FIG. 3. Plate 81 and shaft 21 are locked, as is, consequently, sunwheel 19.

If motor 1 is then started up, sunwheel 26 is carried along by reducer 2 from gears 12 and 13. It thus rotates at a low speed, as already explained.

Thus button 69 rotates in direction F (FIG. 4). At the same time, the graduations on edge 71 pass in front of pointer 70, indicating the duration of time-delay still remaining.

When this duration is exhausted, button 69 has reached 69a and presses against arm 35 of lever 6 which rocks in direction H around shaft 92, thus reaching position 6a (FIG. 4). Arm 36 now locks shaft 11 after vane 95 has pressed button 34 of switch 7.

When winding 25 of electric brake 3 is re-energized, plate 22 returns to 22a, drum 50 is released, and spiral spring 8 brings it back automatically to its original position in which pin 33 is stopped against finger 32. The relay is reset.

It will be observed that the assembly in FIG. 3 also makes it possible to reduce the delay indicated without energizing winding 25. In this case, the reaction of the differential brings about the release of saw-teeth 83 and 89. Cam 5 moves in jerks, which is no disadvantage.

In practice, motor 1 may be supplied with current permanently, as has already been stated. Under these conditions, the time-delay starts with the device in FIG. 3 as soon as the energizing current for electric brake 3 ceases to flow.

It may be seen that this function is assured without any auxiliary contact actuated by electro-magnet 23.

By means of a different assembly, the relay according to the invention makes possible to initiate the time-delay by energising the relay, without any additional parts.

Figure 7:
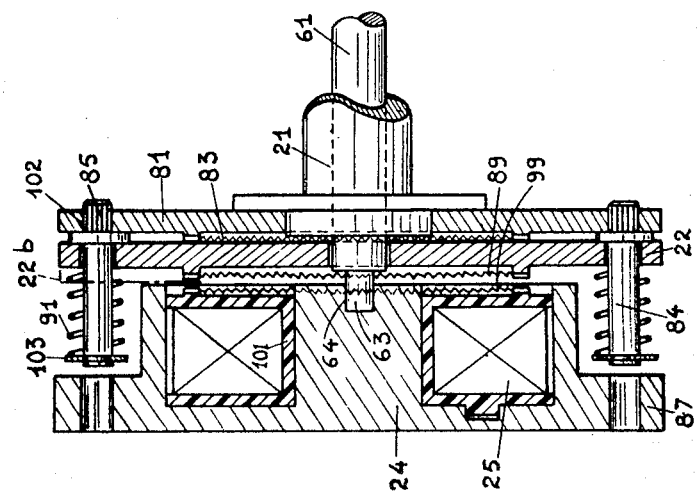
FIG. 7 is a part-sectional view similar to FIG. 3 showing a variation in assembly.

All that is required for this purpose (FIG. 7) is a saw-tooth crown 99 on the flange of winding 101 arranged around core 24. Furthermore, plate 22 is turned over, the saw-teeth being directed towards the teeth 99. The grooved stems 85 of rods 84 are now fixed in bores 102 of plate 81 (rods 84 being simply turned round), and springs 91 are mounted so that they rest against locking washers 103, in such a manner that they separate, in the position of rest, teeth 89 in plate 22 from teeth 99.

In this case, of course, teeth 83 in plate 81 have no use.

It is understood that, in the position of rest, electric brake 3 being de-energized (position in FIG. 7), sleeve 21 and cam 5 may rotate freely. Thus adjustment of the time-delay may be effected by turning rod 77 freely in either direction.

Energizing winding 25 causes plate 22 to move to 22a and compresses springs 91. Plate 81 is then locked by rods 84, and, if the motor is operating, this causes the time-delay to start.

In one or other of its versions, the time-delay relay according to the invention provides numerous technical advantages, in particular the following:

The reducer consists of only 5 toothed wheels (2 planetary gears, 2 sunwheels, and the planetary carrier). It takes up little space and its cost is low.

Assembly is accomplished by stacking the parts on a single shaft which requires less accuracy than the assembly of several shafts between two side plates. A blow of a certain force may destroy the parallelism or alignment of the said side plates; this same blow would be less likely to damage the epicycloid train mounted on a single shaft.

The replacement of the clutch by an electric brake, made possible by the function of the differential, eliminates the problems of friction in transmitting force to a rotating part. The design is simple, economical, and takes up little space.

The considerable reduction provided by the gear 74/tangent worm 75 couple provides great accuracy. Return spring 8 tends to take up the play between worm 75 and gear 78. Thanks to the non-reversible nature of the worm torque, there is no need for a locking system for the adjustment.

The arrangement of the moving scale on cylindrical edge 71 of drum 50 provides a scale of great length, while occupying a smaller frontal area than that required by conventional, flat, circular dials.

With an industrial timing mechanism providing a relatively long time-delay (ten minutes or more), the movement of edge 71 of graduated drum 50 is too slow to verify whether the timing mechanism is operating. If, however, cover 96 is translucent, or has a window opposite planetary-carrier-crown 14, planetary gears 17, 18 may be seen to pass at the rate of several tens of times a minute, which makes it possible to ascertain that the relay is in fact in operation.

In the design of relay with "de-energized" time-delay, of the type in FIG. 3, it has been found that a break, even of a temporary nature, in the feed to motor 1 does not cause any resetting of drum 50, which may be of interest in certain applications, as already stated. All that occurs is that the time-delay is increased by the time of the break in the feed.

It has also been found that the particular design in FIG. 3 may be controlled by electrical pulses, without the need of any auxiliary contact, while such contacts are provided in designs of the prior art to memorize the order given. This is another advantage of the invention.

Finally, the bulk of the relay is very small, especially if it is not in a plug-in form.

In the variant illustrated schematically in FIG. 8, planetary 17 has a tooth width more than double the width of sunwheel 19. On the other hand, sunwheel 26 is slidably mounted on hollow shaft 21, carrying along graduated drum 50 when it slides. The height of cylindrical edge 71 of the latter is doubled and has two graduations, the first, 72, corresponding to the reduction ratio obtained when sunwheel 26 is in engagement with planetary 18. The second graduation, 72a, corresponds to the reduction ratio obtained when sunwheel 26 has reached 26a by sliding along shaft 21, in which position it engages with planetary 17. In this position graduation 72a comes opposite inspection window 98.

In the first position, the reduction ratio is equal, as before, to:

$$1-(n_{19} \cdot n_{18}/n_{17} \cdot n_{26})$$

In the second position, this ratio is changed to the value:

$$1-(n_{19}/n_{26})$$

If the following numbers of teeth are taken for the gears:

$$n_{19}=59,\ n_{17}=60,\ n_{18}=61,\ n_{26}=60$$

it is found that the first reduction ratio is equal to 1/3600 and the second is equal to 1/60. Thus these two ratios themselves are exactly in the ratio of 60, which is of great interest for a time scale. In this case, graduation 72 corresponds, for example, to minutes and graduation 72a corresponds to seconds, or again hours and minutes. Passage from one to the other is effected by a simple translation of sunwheel 26.

The variant in FIG. 9 is remarkable in that the assembly of the two planetaries 17, 18 is mounted so that it can be turned round on shaft 15 of planetary carrier 14.

In the position shown in FIG. 9, the reduction ratio is, as before, equal to:

$$1-(n_{19} \cdot n_{18}/n_{17} \cdot n_{26})$$

If the planetaries are turned round, this ratio becomes equal to:

$$1-(n_{19} \cdot n_{17}/n_{18} \cdot n_{26})$$

Under these conditions, if the following special values are selected for the number of teeth in the gears:

$$n_{19}=30,\ n_{17}=31,\ n_{18}=32,\ n_{26}=31$$

it will be seen that the first ratio is equal to 1/961 and the second is equal to 1/16, these two values being themselves in the ratio of 60 with excellent approximation. One may thus pass from seconds to minutes, or from minutes to hours, by a very simple operation. In relation to the preceding design this design has the advantage of requiring gears with a smaller number of teeth. According to another variant illustrated schematically in FIG. 10, synchronous motor 1 may be stopped in the following manner: lever 6 moves by sliding in direction S, thanks to an appropriate connection to cam 5, and is directed practically radially in relation to shaft 11 of motor 1 which is provided with a drum 104 of larger diameter. When lever 6 is pushed towards drum 104, so that it rests thereon with its edge, it brakes motor 1 energetically.

In the variant in FIG. 11, lever 6 is also mounted to slide in direction S, radially in relation to shaft 11, but the end portion of the said lever is no longer in the plane of displacement. On the contrary, it forms an elbow 105. When lever 6 is pushed towards S, elbow 105 comes to bear against the rounded end of shaft 11, giving rise to a radial component of force and to an axial component.

The latter contributes to the locking of motor 1 by pressure of shaft 11 in its bearing, not shown.

If motor 1 is constructed in such a manner that its rotor locks in the event of axial thrust, then of course the line of action of lever 6 could be purely axial.

Without departing from the scope of the invention, numerous variations could be made in the foregoing designs, in particular the following:

Motor 1 may be of the direct current type, running at a constant speed controlled by a centrifugal-contact device or electronic regulation.

Additional reduction could be obtained by associating with auxiliary gear 13 other reducing gears, or, in the case of very long time delays, by utilizing a tangent worm for gear 12.

Electro-magnet 23 may consist of a flat E-shaped circuit instead of a cylindrical pot.

The stopping of motor 1 could be effected by means of a second contact actuated by lever 6 a little after the operating contact of micro-switch 7.

In the case of a sunwheel 26 mounted slidably in accordance with FIG. 8, three planetaries could be mounted on shaft 15, sunwheel 26 engaging with the second or third according to its lateral position, and drum 50 again comprising two graduations 72 and 72a.

The saw-teeth such as 89 and 83 could be omitted if the attractive force of electric brake 3 is sufficient to prevent any sliding.

It would also be possible to couple to time-delay-adjusting worm 75 a graduated reduction button similar to those used for multi-turn potentiometers. These buttons are generally made, in a manner known per se, with two or three tracks graduated in the ratio of 1 to 10, but they may also be provided with a 1 to 6 ratio, to cause seconds and minutes, or minutes and hours, to appear separately.

The use of racks and pinions, for example to transform the rotary motion of the cam into straight-line motion.

The use of compound epicycloid trains, the output of the first train driving the input of the second train.

Mounting several planetary-carrier shafts like 15 on planetary carriers, to reduce the play or balance the planetary carrier.

I claim:

1. In a time-delay relay for industrial timing mechanisms, comprising a synchronous motor which drives a combined differential and reduction gear of the flat epicyclic type having a first and a second output shaft, a cam driven by said first output shaft and controlling, at a predetermined angular position of said cam, an electrical contact set, and a device ensuring the locking and subsequent release of said second output shaft, which brings about respectively the initiation of the time delay and the resetting to zero thereof; the improvement in which said differential and reduction gear comprises a planetary carrier driven by said synchronous motor and carries at least two planet wheels which are in fixed angular relation to each other, a first planet wheel engaging with a first sunwheel which drives said first output shaft and a second planet wheel engaging with a second sunwheel which drives said second output shaft, said locking and releasing device comprising an electric brake which initiates the time delay at the time it locks said second output shaft and permits the resetting to zero of the time-delay relay when it releases said second output shaft.

2. A relay as claimed in claim 1, said electric brake comprising an electromagnet and a magnetic brake plate arranged to be subjected to the attraction of said electromagnet and to slide axially in a direction parallel to the axis of said second output shaft, and resilient means acting on said brake plate and opposing the attraction of said electromagnet.

3. A relay as claimed in claim 2, in which said magnetic brake plate is fixed angularly and carries a saw-tooth crown engaging, when said electromagnet is deenergized, with another saw-tooth crown carried on a second plate in fixed angular relation with said second output shaft and carrying a saw-tooth crown engaging, 4. A relay as claimed in claim 2, said magnetic brake plate being in fized angular position with said second output shaft and carrying a saw-tooth crown engaging, when said electromagnet is energized, with a second saw-tooth crown located opposite and carried by the body of said electromagnet.

5. A relay as claimed in claim 2, and rods guiding said brake plate during its sliding motion and carrying said resilient means, said rods being so arranged that they may be secured either to said electromagnet or to a plate angularly fixed with said second output shaft.

6. A relay as claimed in claim 1, in which said control cam actuates a pivoting lever which, when actuated, brings about, in sequence, pressure on the push-button of a switch, and the friction-locking of the shaft of the synchronous motor.

7. A relay as claimed in claim 1, in which said first output shaft is arranged to slide parallel to said second output shaft, so that said first sunwheel may engage with either said first or said second planet wheel, and carries a graduated drum provided with a cylindrical edge facing an inspection window, this edge carrying two juxtaposed time-graduated scales each corresponding to one of the active positions of said first sunwheel.

8. A relay as claimed in claim 7, in which said first planet gear has 61 teeth, said first sunwheel has 60 teeth, said second planet gear has 60 teeth and said second sunwheel has 59 teeth.

9. A relay as claimed in claim 1, in which said planet gears are part of an assembly which may be turned about end-to-end so as to interchange the positions of said planet wheels and correspondingly cause said first planet wheel to engage with said second sunwheel and second planet wheel to engage with said first sunwheel.

10. A relay as claimed in claim 9, in which said first planet wheel has 32 teeth, said first sunwheel has 31 teeth, said second planet wheel has 31 teeth and said second sunwheel has 30 teeth.

11. A relay as claimed in claim 1, said can actuating a braking lever for the motor which acts on a drum of greater radius disposed on the shaft of the motor.

12. A relay as claimed in claim 1, said cam actuating a braking lever for the motor which acts upon the shaft of the motor through an elbow arranged obliquely in relation to said shaft.

13. A relay as claimed in claim 1, and a translucent cover through which said differential and reduction gear may be observed.

References Cited

UNITED STATES PATENTS

| | | | |
|---|---|---|---|
| 2,130,901 | 9/1938 | Rankin | 335—75 |
| 2,774,422 | 12/1956 | Fielding | 335—65 |
| 2,792,468 | 5/1957 | Kozikowski | 335—65 |
| 3,231,699 | 1/1966 | Bennett | 335—65 |

BERNARD A. GILHEANY, *Primary Examiner.*

H. BROOME, *Assistant Examiner.*